(12) United States Patent
Nishimura

(10) Patent No.: US 8,964,534 B2
(45) Date of Patent: Feb. 24, 2015

(54) MONITOR/CONTROL DEVICE AND MONITOR TARGET DEVICE

(75) Inventor: Tomotsune Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 49 days.

(21) Appl. No.: 13/386,602

(22) PCT Filed: Jul. 28, 2010

(86) PCT No.: PCT/JP2010/062704
§ 371 (c)(1),
(2), (4) Date: Jan. 23, 2012

(87) PCT Pub. No.: WO2011/013705
PCT Pub. Date: Feb. 3, 2011

(65) Prior Publication Data
US 2012/0120792 A1    May 17, 2012

(30) Foreign Application Priority Data

Jul. 31, 2009  (JP) ................................ 2009-179216

(51) Int. Cl.
H04L 12/26 (2006.01)
H04B 1/74 (2006.01)
H04L 12/24 (2006.01)

(52) U.S. Cl.
CPC H04B 1/74 (2013.01); H04L 41/04 (2013.01); H04L 41/0663 (2013.01); H04L 41/0695 (2013.01)
USPC ............................. 370/225; 370/236; 370/247

(58) Field of Classification Search
CPC .......................................................... H04J 3/14
USPC .................................. 370/221–228, 236, 247
See application file for complete search history.

(56) References Cited

U.S. PATENT DOCUMENTS 5,452,286 A * 9/1995 Kitayama ..................... 370/228
6,763,195 B1  7/2004 Willebrand et al.
(Continued)

FOREIGN PATENT DOCUMENTS

CN  1451210  10/2003
CN  1893338  1/2007
(Continued)

OTHER PUBLICATIONS

International Search Report, PCT/JP2010/062704, Sep. 21, 2010.
(Continued)

*Primary Examiner* — Un C Cho
*Assistant Examiner* — Romani Ohri
(74) *Attorney, Agent, or Firm* — Young & Thompson

(57) ABSTRACT

A monitor and control device includes a monitor and control unit transmitting to a monitor target device a monitor and control signal (M&CS) through a M&CS path in a case of a malfunction occurred in a main signal path, and transmits to the monitor target device the M&CS through the main signal path in a case of a malfunction occurred in the M&CS path, the monitor target device including: a first path connection unit connected to the main signal path passing either a main signal in which the M&CS for monitoring and controlling the monitor target device is multiplexed or a main signal in which the M&CS is not multiplexed; a second path connection unit connected to the M&CS path passing the M&CS; and a selection unit selecting whether to perform transmission and reception of the M&CS by either one of the main signal path and the M&CS path.

14 Claims, 8 Drawing Sheets

(56) References Cited

U.S. PATENT DOCUMENTS

| | | | |
|---|---|---|---|
| 7,110,678 | B2 | 9/2006 | Willebrand et al. |
| 7,345,991 | B1 * | 3/2008 | Shabtay et al. ............... 370/221 |
| 8,331,237 | B2 | 12/2012 | Umeda |
| 2006/0291378 | A1 | 12/2006 | Brotherston et al. |
| 2010/0020705 | A1 * | 1/2010 | Umeda ........................ 370/252 |

FOREIGN PATENT DOCUMENTS

| | | |
|---|---|---|
| CN | 101488887 | 7/2009 |
| EP | 1898575 A2 * | 3/2008 |
| JP | 6277729 | 4/1987 |
| JP | 03-177191 | 8/1991 |
| JP | 04-040022 | 2/1992 |
| JP | 04-082425 | 3/1992 |
| JP | 05-129993 | 5/1993 |
| JP | 08-084100 | 3/1996 |
| JP | 2004-235791 | 8/2004 |
| JP | 2005-277504 | 10/2005 |
| JP | 2009171265 | 7/2009 |
| RU | 2282229 | 8/2006 |
| WO | 92/11710 | 7/1992 |

OTHER PUBLICATIONS

Russian Notice of Allowance—2012101877—Mar. 4, 2013.
RU Office Action dated Oct. 17, 2012, with English translation; Application No. 2012101877.
JP Office Action dated Jun. 17, 2014, with English translation; Application No. 2011-524812.
CN Office Action dated Sep. 17, 2013, with English Translation; Application No. 201080033215.3.
Japanese Office Action dated Sep. 2, 2014, in corresponding Japanese Patent Application No. 2011-524812, with partial English translation.

* cited by examiner

MONITOR/CONTROL DEVICE AND MONITOR TARGET DEVICE

TECHNICAL FIELD

The present invention relates to technology for monitoring and controlling a terminal device that is connected to a network.

BACKGROUND ART

In recent years, microwave communication systems have been attracting attention as a means of interpolating between optical transmission lines and wireless trunk lines. A microwave transmission system has a wide range of uses such as replacing and backing up a mobile telephone network, inter-building communication, and an optical communication network. Recently, demand for microwave transmission systems as a communication system that connects base stations in the mobile telephone network market, which is rapidly expanding globally, has been greatly extending owing to such characteristics as the economical performance of devices, the ease of construction, the flexibility with respect to system modifications, and the large capacity.

As demand for higher speed and wider area communication increases accompanying the aforementioned, the provision of a lower cost and high-quality line service has been desired. For example, as the complexity of mobile networks increases, a reduction in the CAPEX (capital expenditure) and OPEX (operating expense) of operators is sought. For that reason, an improvement in technology that performs line switching during fault occurrence is absolutely necessary in terms of the economical performance of communication devices. Also, it is necessary to flexibly and dynamically perform monitor/control line switching processing and route change processing between NMSs (network management systems) and NEs (network elements). Therefore, technology for realizing these has conventionally been proposed (refer to Patent Document 1).

In order to dynamically realize the monitor/control line switching processing and route change processing as described above, a monitor/control signal (hereinbelow called an "SV signal") is used. There are times when communication is performed with the SV signal separated from than the main signal and using a different path in the wired section line between NEs. Also, there are times when communication is performed with the SV signal being multiplexed on the main signal to use the same path in the wired section line between NEs. SV is an abbreviation for Supervisory.

PRIOR ART DOCUMENT

Patent Document

[Patent Document 1] Japanese Unexamined Patent Application, First Publication No. 2004-235791

SUMMARY OF THE INVENTION

Problem to be Solved by the Invention

In the case of communication being performed with the SV signal being separated from the main signal, when a fault occurs in the path that is used for communication of the SV signal, it becomes no longer possible for the NMS to continue monitor/control of NEs. On the other hand, in the case of communication being performed with the SV signal being multiplexed with the main signal, when a fault occurs in the path that is being used for communication of the main signal, it becomes impossible for the NMS to continue monitor/control of NEs.

In view of the aforementioned circumstances, the present invention has as its object to provide a monitor and control device and a monitor target device that can continue monitor or control of a network element even when a malfunction has occurred in either one of the path for the monitor and control signal or the path for the main signal.

Means for Solving the Problem

A monitor control device according to the first aspect of the present invention includes a monitor and control unit that transmits to a monitor target device a monitor and control signal through a monitor and control signal path in a case of a malfunction occurred in a main signal path, and transmits to the monitor target device the monitor and control signal through the main signal path in a case of a malfunction occurred in the monitor and control signal path, the monitor target device including: a first path connection unit that is connected to the main signal path passing either a main signal in which the monitor and control signal for monitoring and controlling the monitor target device is multiplexed or a main signal in which the monitor and control signal is not multiplexed; a second path connection unit that is connected to the monitor and control signal path passing the monitor and control signal; and a selection unit that selects whether to perform transmission and reception of the monitor and control signal by either one of the main signal path and the monitor and control signal path.

A monitor target device according to a second aspect of the present invention is monitored and controlled by a monitor and control device, and includes: a first path connection unit that is connected to a main signal path passing either a main signal in which a monitor and control signal for the monitor and control device to monitor and control the own device is multiplexed or a main signal in which the monitor and control signal is not multiplexed; a second path connection unit that is connected to a monitor and control signal path passing the monitor and control signal; and a selection unit that selects whether to perform transmission and reception of the monitor and control signal by either one of the main signal path and the monitor and control signal path.

Effect of the Invention

According to the present invention, it is possible to continue monitoring or control of a network element even in the case of a malfunction having occurred in either one of the path for a monitor and control signal or a path for a main signal.

EMBODIMENTS FOR CARRYING OUT THE INVENTION

Figure 1:
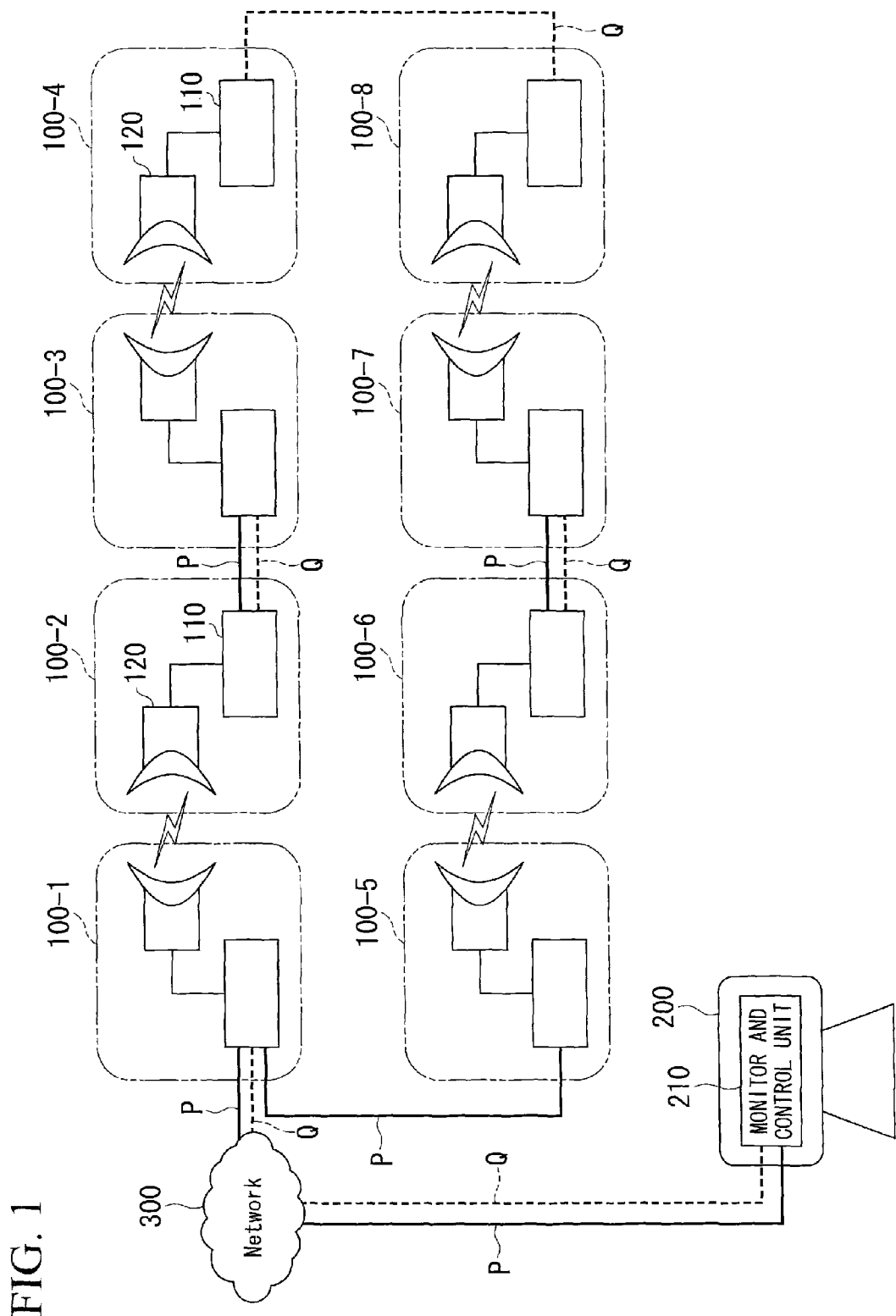
FIG. 1 is a system configuration view that shows the system configuration of a communication system in one exemplary embodiment of the present invention.

FIG. 1 is a system configuration diagram that shows the system configuration of a communication system 1. FIG. 1 shows the configuration of the case of the communication system 1 being applied to a microwave communication system. An NE (network element) 100 (100-1 to 100-5) of the microwave communication system performs communication with an NMS (network management system) 200 via a network 300. Also, the NE 100 communicates with another NE 100 that is adjacent by wire communication or microwave communication. The microwave communication system is one aspect of the communication system 1. The communication system 1 may also be applied to a communication system in which another communication format is adopted if it is a communication system that monitors/controls via the NMS 200 a plurality of NEs 100 that are installed in a network that includes wire communication paths in one portion.

The NE (monitor target device) 100 includes an IDU (indoor unit) 110, an ODU (outdoor unit) 120, and a separating and synthesizing unit (HYB). The IDU 110 processes signals and realizes communication with another NE 100 via the ODU 120 that is connected thereto or a wire cable. The ODU 120 includes an antenna, and performs wireless communication by microwave communication with another ODU 120 with their antennas mutually facing.

An NMS (monitor and control device) 200 has a monitor and control unit 210 that performs monitor and control of each NE 100 of the communication system 1 by transmitting and receiving a monitor/control signal (SV signal: Supervisory signal) with each NE 100 via the network 300. Also, the monitor and control unit 210 of the NMS 200 performs transmission and reception of the main signal via the network 300. Hereinbelow, the monitor and control unit 210 of the NMS 200 is simply referred to as the NMS 200.

The communication system 1 has a communication path that is used when transmitting and receiving the main signal (hereinbelow referred to as the "main signal path") and a communication path that is used when transmitting and receiving an SV signal (hereinbelow referred to as the "SV signal path"). In FIGS. 1 to 3, 7 and 8, the path that is denoted by the reference symbol P (the path with a solid line) shows the main signal path. The path that is denoted by the reference symbol Q (the path with a broken line) shows the SV signal path. The main signal path and the SV signal path are realized by using cable or lines that physically differ. The main signal is the main signal that is transmitted and received in the communication system 1. The main signal includes for example the signal that is transmitted and received by the terminal device of the end user (user data signal), and the control signal between NEs 100 that is transmitted and received by the NE 100 with another NE 100. The SV signal is the signal that is used when the NMS 200 performs monitoring and control of each NE 100.

As shown in FIG. 1, the main signal path P and the SV signal path Q are connected from the network 300 to the NE 100-1. The main signal path P is formed between the NE 100-1 and the NE 100-5. The main signal path P and the SV signal path Q are formed between the NE 100-2 and the NE 100-3, and between the NE 100-6 and the NE 100-7. The SV signal path Q is formed between the NE 100-4 and the NE 100-8. The main signal and the SV signal are transmitted and received by microwave communication. For that reason, transmission and reception of the main signal and the SV signal are performed by microwave communication between the NE 100-1 and the NE 100-2, between the NE 100-3 and the NE 100-4, between the NE 100-5 and the NE 100-6, and between the NE 100-7 and the NE 100-8.

Figure 2:
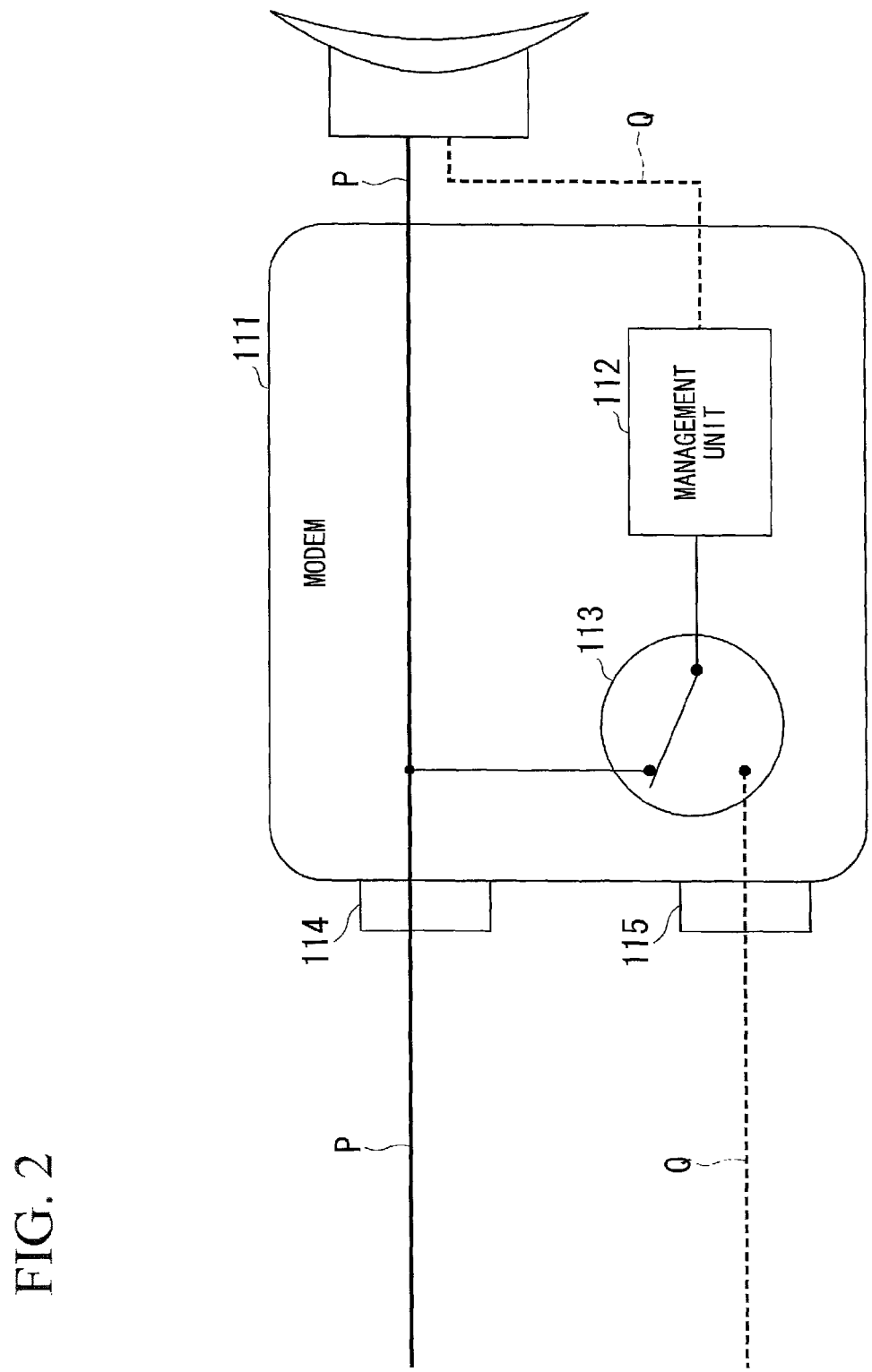
FIG. 2 is a diagram that shows a configuration example of a logical connection of modem in one exemplary embodiment of the present invention.

FIG. 2 is a diagram that shows a configuration example of the logical connection of a modem 111. The modem 111 is deployed within the IDU 110, performs signal conversion processing, and performs wireless communication via the ODU 120. In the microwave communication between the ODUs 120, the main signal and the SV signal are transmitted and received as described above. Specifically, the SV signal is transmitted (in-band transmitted) by being multiplexed in a wireless frame of the main signal by the modem 111, in the microwave communication between the ODUs 120. The modem 111 includes a management unit 112 (detection unit), a management switch (selection unit) 113, a first port (first path connection unit) 114, and a second port (second path connection unit) 115.

The management unit 112 performs a separation process of the SV signal that has been multiplexed on the main signal and a multiplexing process (synthesizing process) of the SV signal on the main signal. The management unit 112 performs switching of the management switch 113 in accordance with control that is performed by the NMS 200. The management unit 112 performs abnormality detection/fault management such as SV signal LOS (Loss of Signal), LOF (Loss of Frame), OOF (Out of Frame) and the like. In the case of an abnormality being detected, the management unit 112 changes the selected port by controlling the management switch 113, and realizes dynamic line switching and path changing.

The management switch 113 is controlled by the management unit 112, and selects the first port 114 or the second port 115.

The first port 114 transmits traffic either of the main signal with which the NMS/NE management data (the SV signal) has been multiplexed or the main signal with which the SV signal has not been multiplexed. The second port 115 transmits traffic only of the SV signal. Since the second port 115 does not transmit traffic of the main signal, in the case of the SV signal and the main signal being transmitted without being multiplexed, it is possible to avoid network convergence of the main signal.

In the case of the management switch 113 having selected the first port 114, the second port 115 is not used, and in-band transmission of the main signal and the SV signal is executed by the first port 114. In the case of the management switch 113 having selected the second port 115, the first port 114 transmits only the main signal, and the second port transmits only the SV signal by out-of-band transmission. For that reason, regardless of the selection state of the management switch 113, at all times the first port 114 performs transmission of the main signal, and the second port 115 does not perform transmission of the main signal.

Figure 3:
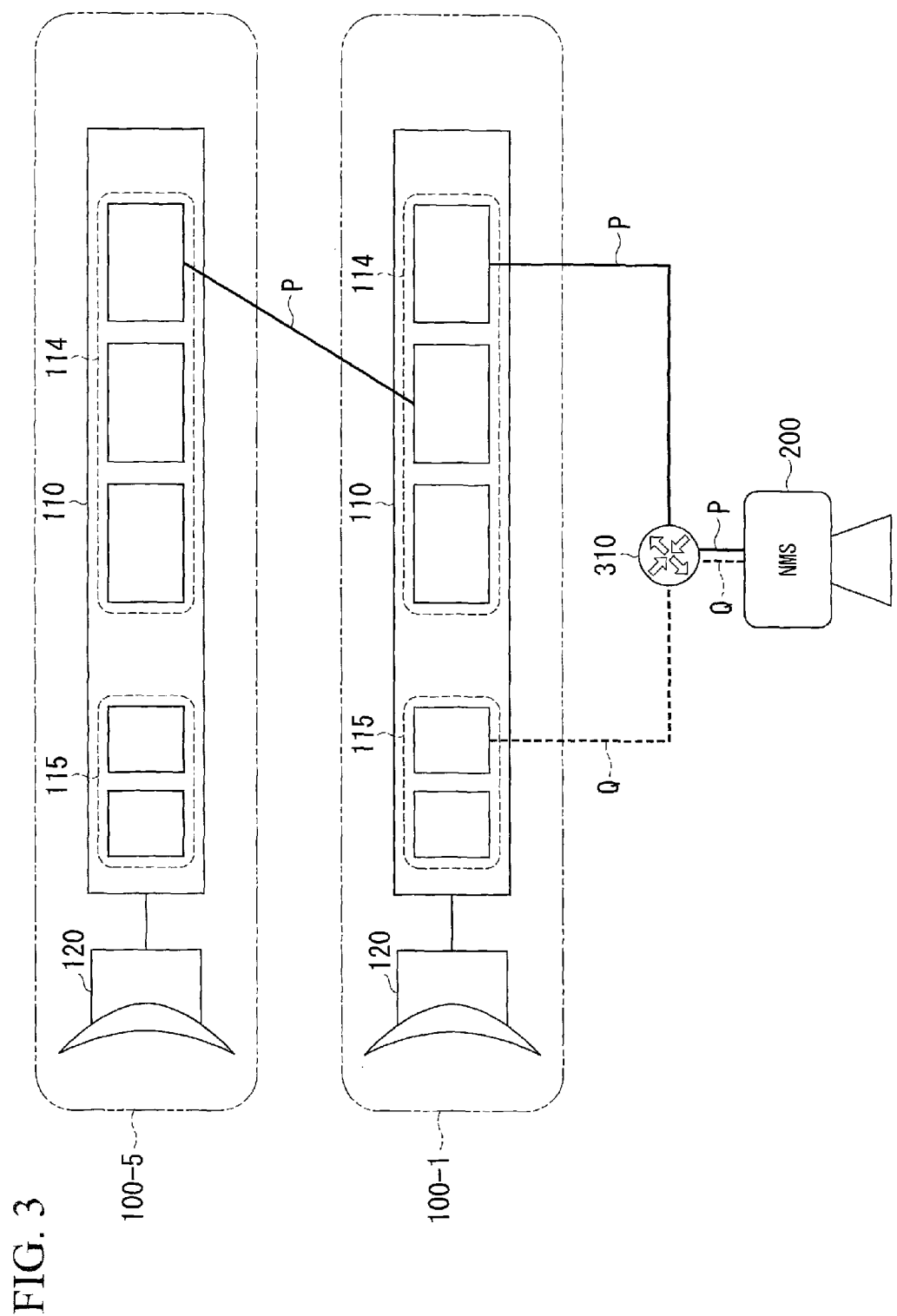
FIG. 3 is a configuration example of a physical connection in the case of IDUs communicating by wires in the one exemplary embodiment of the present invention.

FIG. 3 is a configuration example of the physical connections in the case of the IDUs 110 performing wired communication with each other. FIG. 3 in particular shows an example of the connection of each IDU 110 of the NE 100-1 and NE 100-5 among the eight NEs 100 in FIG. 1. In each IDU 110, the main signal path P is formed by a cable being connected via the first port 114. FIG. 3 shows the network 300 as a network device 310. In this case, the NMS 200 performs monitoring and control of each NE 100 via the network device 310.

Figure 4:
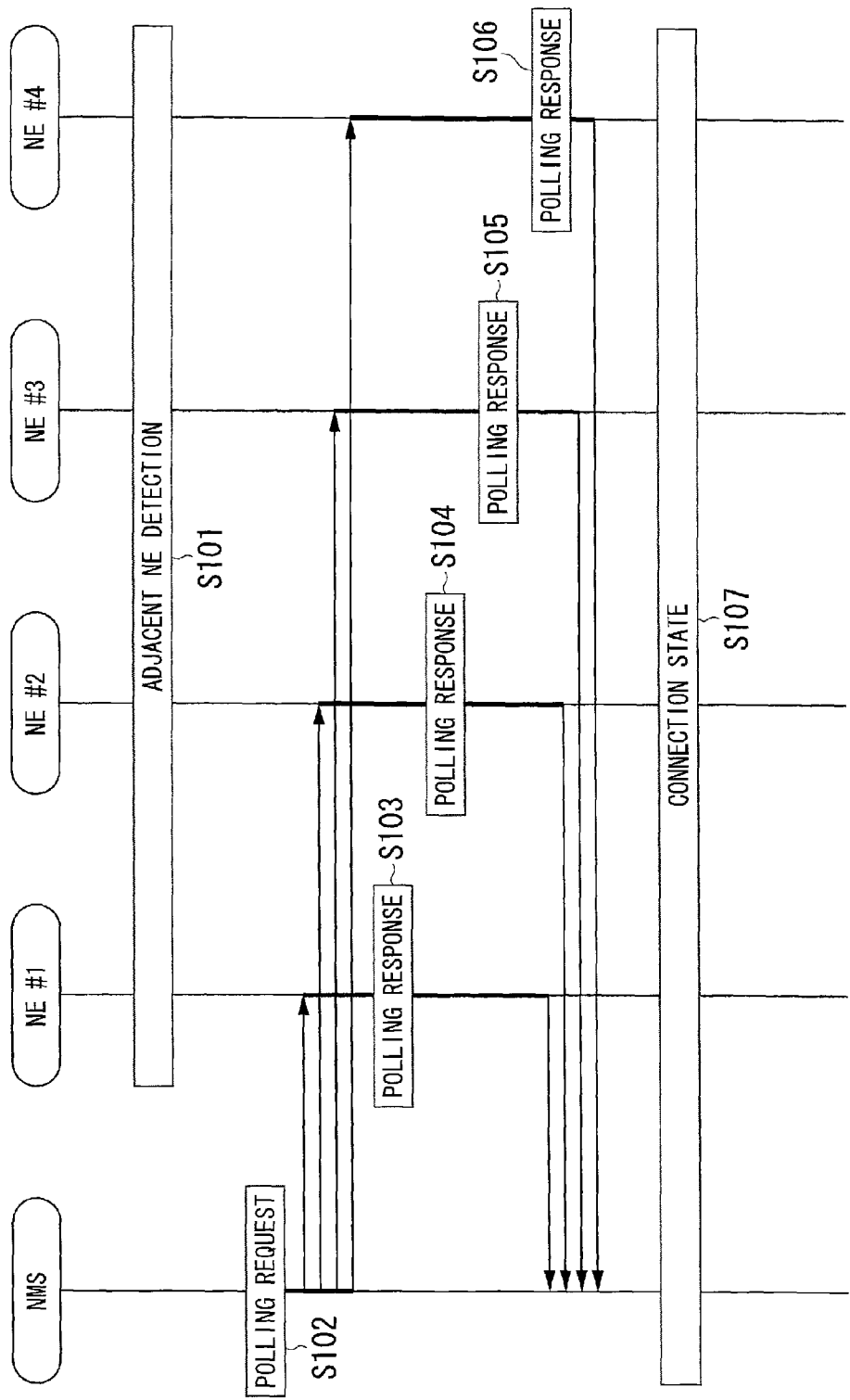
FIG. 4 shows a sequence that is premised on all of main signal paths and SV signal paths in NEs operating normally in the one exemplary embodiment of the present invention.
Figure 5:
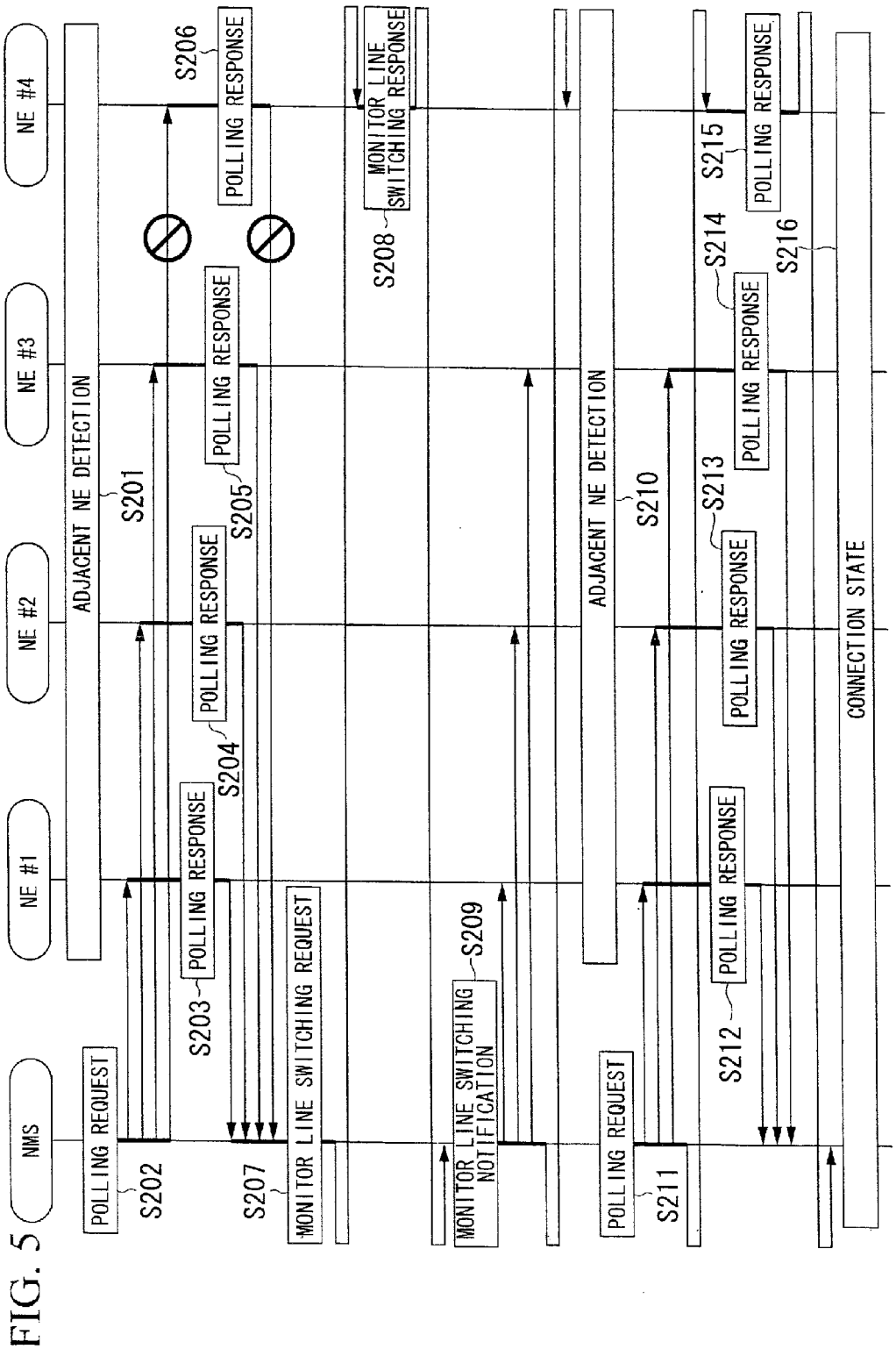
FIG. 5 shows a sequence of a path change process by NMS in the case of an abnormality having occurred in the main signal path or the SV signal path in the one exemplary embodiment of the present invention.
Figure 6:
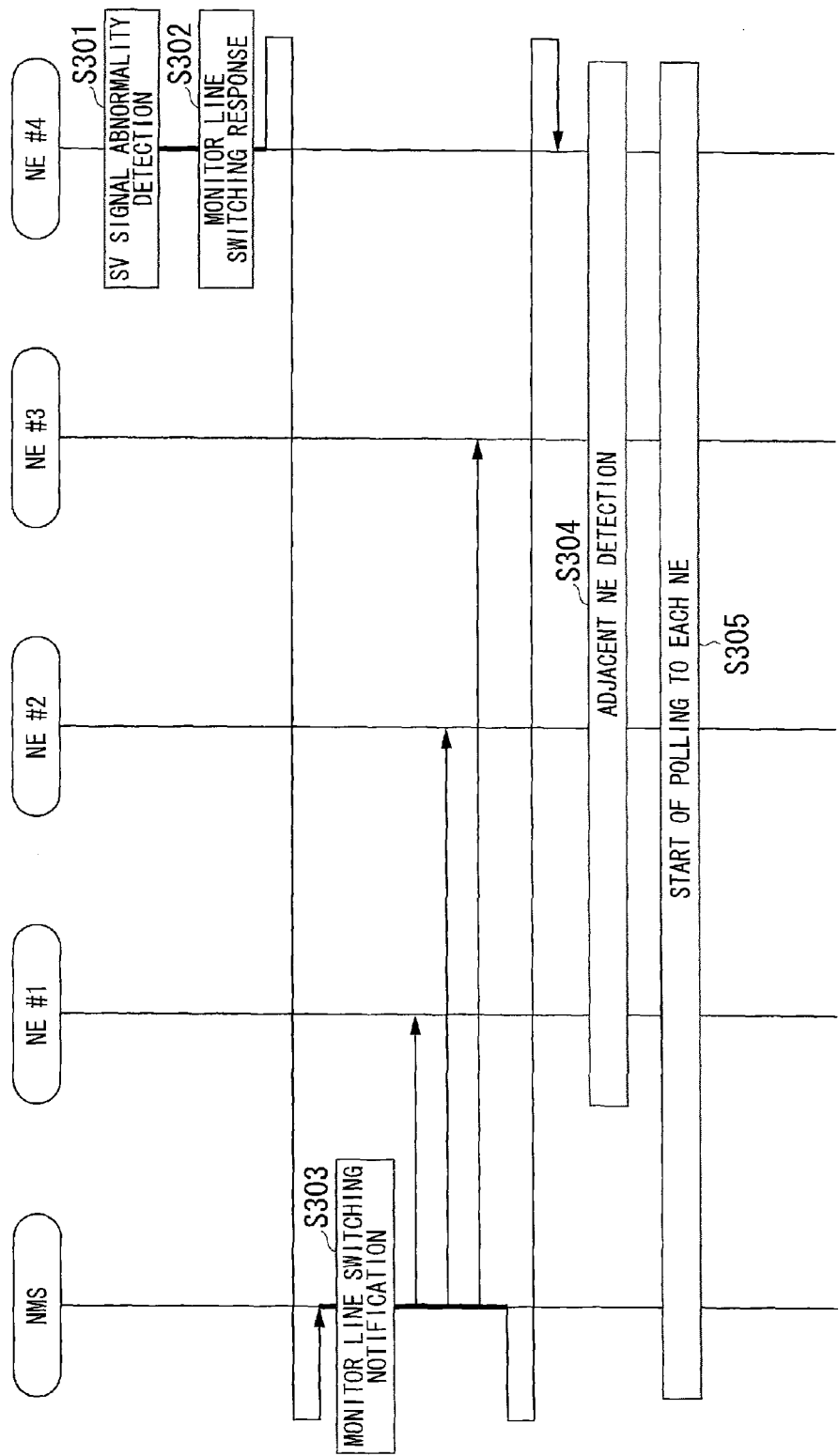
FIG. 6 shows a sequence of a path change process by NEs in the case of an abnormality having occurred in the main signal path or the SV signal path in one exemplary embodiment of the present invention.

FIG. 4 to FIG. 6 are sequence diagrams that show the sequence of the communication system 1. NE #1 to NE #4 in FIG. 4 to FIG. 6 need not necessarily correspond to NE 100-1 to NE 100-4 of FIG. 1. That is to say, it is only required that the NE #1 to NE #4 in FIG. 4 to FIG. 6 are connected in a manner allowing communication with the NMS 200 via the network 300, and a path of wired communication is included in the portion of the network with the NMS 200. The NE #1 to NE #4 may be connected with the NMS 200 by any network configuration provided it is a network configuration that satisfies the aforementioned conditions. For example, the NE #1 to NE #4 may be constituted as terminals (for example NE 100-1 and NE 100-5 in FIG. 1) that are connected by wired communication with the entire network 300. NE #1 to NE #4 are also notated as NE 100#1 to NE 100#4.

The sequence that is shown in FIG. 4 shall be described. FIG. 4 shows a sequence that is premised on all of the main signal path and the SV signal path in each of the NEs 100 (NE #1 to NE #4) operating normally.

First, each NE 100 detects the primary IP address of the adjacent NE 100 by wired communication or microwave communication, and establishes a connection (Step S101). It is premised on an IP address being registered in advance for each port of the IDU 110 of each NE 100, and the primary IP address of the IDU 110 being chosen based on the IP address of each port.

Next, the NMS 200 sends a polling request to each NE 100 (Step S102). Each NE 100, upon receiving the polling request, transmits a polling response to the NMS 200, which is the transmission source of the polling request (Steps S103 to S106). Then, the NMS 200 confirms having received the polling responses from all of the NEs 100, and completes the connection confirmation (Step S107). The process commands of Steps S101 to S106 are transmitted and received by using the SV signal.

FIG. 5 shows the sequence of the path change process by the NMS 200 in the case of an abnormality having occurred in either one of the main signal path or the SV signal path. More specifically, FIG. 5 shows the sequence in the case of the management switch 113 of the modem 111 of each IDU 110 selecting in advance the second port 115 (out-of-band), and a malfunction having occurred in the SV transmission path between the NE 100#3 and the NE 100#4. This is premised on the main signal path (wired connection) via the first port 114 of each NE 100 being normal, and the main signal multiplexing the frame of the monitor line switching command (monitor line switching request, monitor line switching response) as an auxiliary signal.

First, each NE 100 detects the primary IP address of the adjacent NE 100 by wired communication or microwave communication and establishes a connection in the same manner as the case of FIG. 4 (Step S201). Next, the NMS 200 transmits a polling request to each NE 100 (Step S202). In the case of FIG. 5, the management switch 113 of the modem 111 of each IDU 110 selects in advance the second port 115 (out-of-band), and a malfunction occurs in the SV signal path between the NE 100#3 and the NE 100#4. For that reason, the polling request that is transmitted as the SV signal does not reach the NE 100#4, and the NMS 200 does not receive the polling response from the NE 100#4 (Step S206). On the other hand, since a malfunction has not occurred in the SV signal path between the remaining NEs 100 and the NMS 200, the NMS 200 receives polling responses from the NE 100#1 to NE 100#3 (Steps S203 to S205).

In this case, the NMS 200 transmits a monitor line switching request to the NE 100#4 from which a polling response was not received (Step S207). The NM 200 for example transmits the monitor line switching request to that NE 100 in the case of a polling request not being received after the passage of a predetermined time from transmitting the polling request in the process of Step S202.

As described above, the monitor line switching request is transmitted and received multiplexed on the main signal. Also, in the case of FIG. 5 a malfunction does not occur in the main signal path. For that reason, if a malfunction has occurred in the SV signal path, the monitor line switching request that was sent from the NMS 200 reaches the NE 100#4. When the NE 100#4 receives the monitor line switching request from the NMS 200, the management unit 112 of the NE 100#4, by controlling the management switch 113, changes the selected port from the second port 115 to the first port 114 to perform the monitor line switching. Then, the NE 100#4 transmits the monitor line switching request to the NMS 200 (Step S208). At this time, the NE 100#4, by multiplexing the monitor line switching request on the main signal as an auxiliary signal, transmits the monitor line switching request.

Upon receiving the monitor line switching response from the NE 100#4, the NMS 200 transmits a monitor line switching notification using the path after line switching to each NE 100 (the path via the second port 115 for the NEs 100#1 to 100#3, and the path via the first port 114 for the NE 100#4) (Step S209). Afterwards, the NMS 200 can perform monitoring and control of the NEs by the SV signal.

Next, each NE 100, prompted by reception of the monitor line switching notification, performs adjacent NE detection (Step S210). This process is the same as the process of Step S201, except for the transmission path differing with respect to the NE 100#4. Thereafter, the NMS 200 transmits a polling request in the same manner as Step S201 using the path after line switching (Step S211). Next, the NMS 200 receives a polling response from each NE 100 by the path after line switching (Steps S212 to S215). Thereafter, the NMS 200 confirms having received the polling responses from all of the NEs 100, and completes the connection confirmation (Step S216). The commands of adjacent NE detection, polling request, and polling response are transmitted and received by using the SV signal.

In the sequence of FIG. 5, in the aforementioned description, the path after line switching is the path via the second port 115 to the NEs 100#1 to 100#3, and the path via the first port 114 to the NE 100#4. However, after the line switching, the paths to all of the NE 100#1 to NE 100#4 may be paths via the first port 114. In this case, the management unit 112 of each NE 100 changes the selected port from the second port 115 to the first port 114 to perform monitor line switching by controlling the management switch 113 prior to performing adjacent NE detection, prompted by reception of the monitor line switching notification. Then, each NE 100 performs adjacent NE detection by the path after line switching. However, this case is premised on a malfunction not occurring in the transmission path via the first port 114 in the NE 100#1 to NE 100#3.

FIG. 6 shows the sequence of the path changing process by each NE 100 in the case of an abnormality having occurred in the main signal path or the SV signal path. More specifically, FIG. 6 shows the sequence in the case of a malfunction having occurred between the NE 100#3 and the NE 110#4. The sequence of FIG. 6 is premised on the NE 100 that has detected a malfunction having a redundant path due to a wired connection, and the SV signal multiplexing the frame of the monitor line switching command as an auxiliary signal in the same manner as the main signal.

The management unit 112 of each NE 100, upon detecting that an abnormality has occurred in the SV signal (Step S301), performs line switching by controlling the management switch 113. For example, in the case of the second port 115 being selected at the point in time of the occurrence of an abnormality being detected, it changes to the first port 114, and in the case of the first port 114 being selected at the point in time of the occurrence of an abnormality being detected, it changes to the second port 115. Then, the NE 100 (NE 100#4 of FIG. 6) that has detected that an abnormality has occurred in the SV signal transmits a monitor line switching response to the NMS 200 (Step S302). At this time, the NE 100#4 transmits the monitor line switching response by multiplexing the monitor line switching response on the main signal as an auxiliary signal.

The NMS 200, upon receiving the monitor line switching response from any of the NEs 100, transmits a monitor line switching notification using the path after line switching to all of the NEs 100 (Step S303). Afterwards, the NMS 200 can perform monitoring and control of the NEs 100 by the SV signal, for each NE 100. Each NE 100, prompted by reception of the monitor line switching notification, performs adjacent NE detection (Step S304). Then, the NMS 200 transmits a polling request to each NE 100, and using the path after line switching completes the connection confirmation (Step S305).

In the sequence of FIG. 6, in the same manner as the sequence of FIG. 5, after line switching the paths to all of the NE 100#1 to NE 100#4 may become paths via the same port. In this case, the management unit 112 of each NE 100, prompted by reception of the monitor line switching notification, changes the selected port to perform monitor line switching by controlling the management switch 113 prior to performing adjacent NE detection. Then, each NE 100 performs adjacent NE detection by the route after line switching. This case as well is premised on a malfunction not occurring in the communication path that is used after switching in the NE 100#1 to NE 100#3.

According to the communication system 1 that is constituted in this way, the NMS 200 can detect the occurrence of a malfunction by a polling response not being received, and switch the monitor line between the NMS/NE. In other words, it is possible to dynamically perform a path changing process of a monitor line by the NMS 200.

Also, according to the communication system 1, the NE 100 can switch the monitor line between the NMS/NE on the occasion of fault detection of the SV signal. In other words, it is possible to dynamically perform a path changing process of a monitor line by each NE 100.

Also, according to the communication system 1, it is possible to perform monitoring and control of each NE 100 by the NMS 200 by means of in-band and out-of-band transmission.
<Modification>

Figure 7:
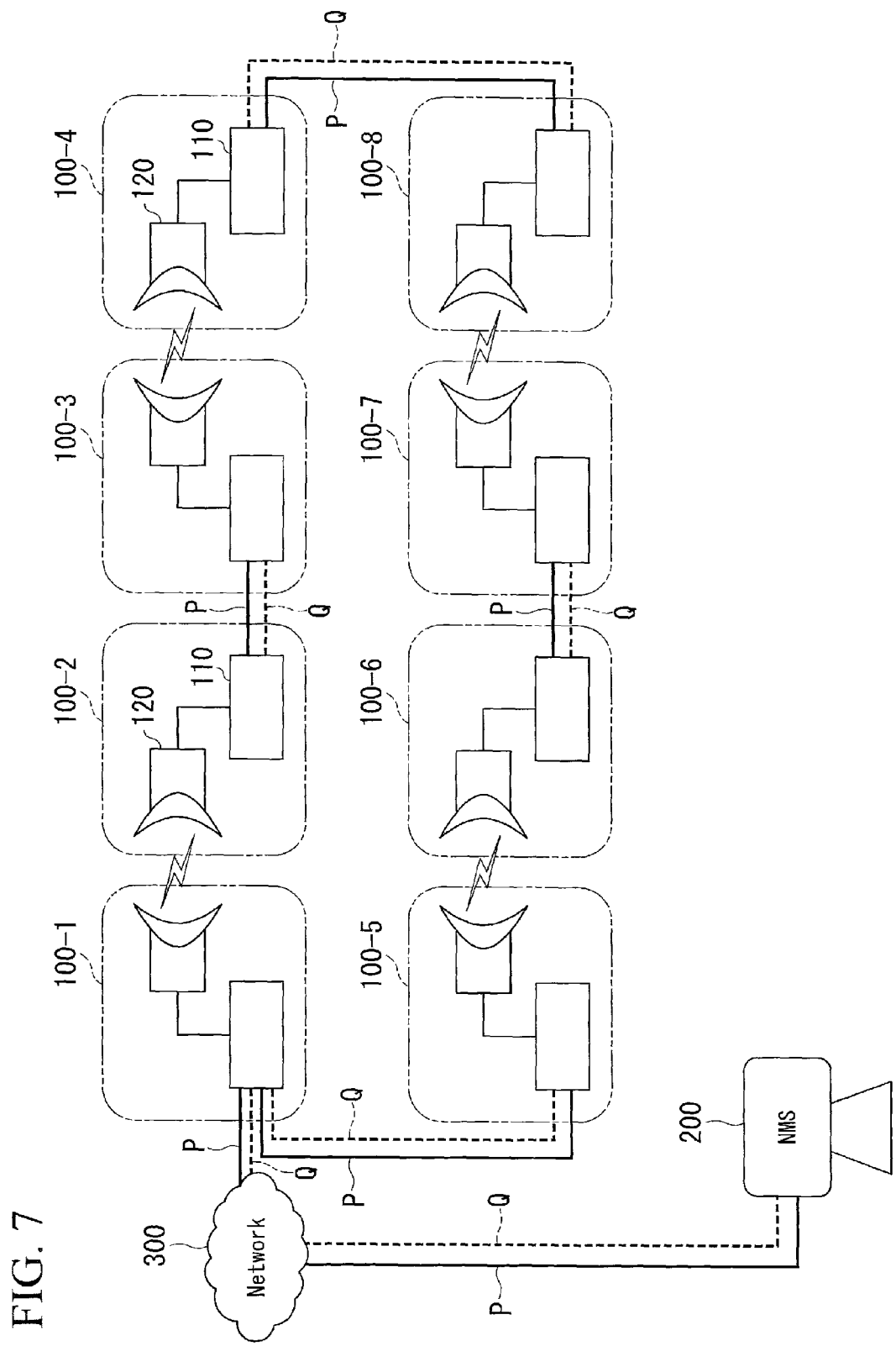
FIG. 7 is a system configuration diagram that shows the system configuration of a modification of the communication system in the one exemplary embodiment of the present invention.

FIG. 7 is a system configuration diagram that shows the system configuration of a modification of the communication system 1. The system configuration shown in FIG. 7 differs from the system configuration shown in FIG. 1 on the point of the NE 100-1 and the NE 100-5 being connected by the main signal path and the SV signal path, and the NE 100-4 and the NE 100-8 being connected by the main signal path and the SV signal path. The system configuration that is shown in FIG. 7 is the same as FIG. 1 with regard to the remaining constitutions.

Figure 8:
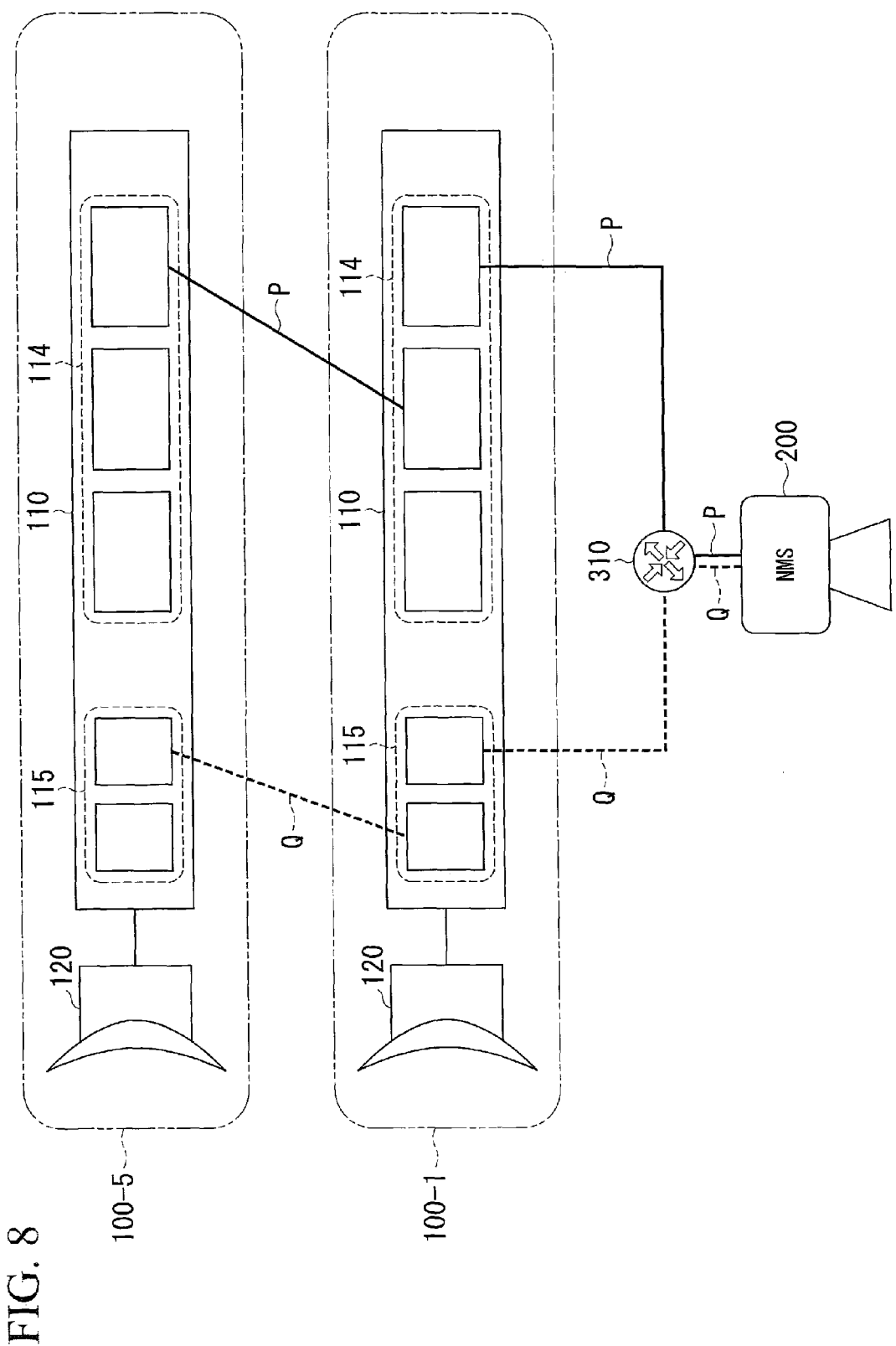
FIG. 8 is a configuration example of a physical connection in the case of IDUs communicating by wires in the modification shown in FIG. 7.

FIG. 8 is a configuration example of the physical connections in the case of the IDUs 110 being connected by wires in the modification. FIG. 8 in particular shows an example of connection of each IDU 110 of the NE 100-1 and NE 100-5, among the eight NEs 100 in FIG. 7. In each of the IDUs 110, the main signal path P is formed by a cable being connected via the respective first ports 114. Also, in each of the IDUs 110, the SV signal path Q is formed by a cable being connected via the respective second ports 115. In FIG. 8, the network 300 is expressed as a network device 310. In this case, the NMS 200 performs monitoring and control of each NE 100 via the network device 310.

According to the modification of the communication system 1 that is constituted in this way, in the case of the second port 115 being selected in the NE 100, it is possible to transmit the traffic of the SV signal using the first port 114. In that case, since the same SV signal is transmitted to the first port 114 and the second port 115, redundancy of the monitor and control line is possible between the NMS/NE as in FIG. 7, and so reliability is improved.

Hereinabove, the exemplary embodiments of the present invention have been described in detail with reference to the drawings, but specific constitutions are not limited to these exemplary embodiments, and designs are also included of a scope that does not depart from the gist of this invention.

This application is based upon and claims the benefit of priority from Japanese patent application No. 2009-179216, filed on Jul. 31, 2009, the disclosure of which is incorporated herein in its entirety by reference.

INDUSTRIAL APPLICABILITY

The present invention may be applied to technology for monitoring and controlling a terminal device that is connected to a network. According to the present invention, even in the case of a malfunction occurring in either one of the path for the monitor and control signal or the path for the main signal, it is possible to continue monitoring or control of the network element.

DESCRIPTION OF REFERENCE SYMBOLS

100 NE (monitor target device)
200 NMS (monitor and control device)
300 Network
110 IDU
111 Modem
112 Management unit (detection unit)
113 Management switch (selection unit)
114 First port (first path connection unit)
115 Second port (second path connection unit)
120 ODU

The invention claimed is:
1. A monitor and control device comprising:
a monitor and control unit that transmits to a monitor target device a monitor and control signal through a monitor and control signal path in a case of a malfunction occurred in a main signal path, and transmits to the monitor target device the monitor and control signal through the main signal path in a case of a malfunction occurred in the monitor and control signal path, the monitor target device including:
- a first connection path that is connected to the main signal path passing either a main signal in which the monitor and control signal for monitoring and controlling the monitor target device is multiplexed or a main signal in which the monitor and control signal is not multiplexed;
- a second connection path that is connected to the monitor and control signal path passing the monitor and control signal; and
- a selection unit that selects whether to perform transmission and reception of the monitor and control signal by either one of the main signal path and the monitor and control signal path, wherein the monitor and control unit transmits a polling request to the monitor target device through the monitor and control signal path, and the monitor and control unit transmits a monitor line switching request to the monitor target device through the main signal path in a case of not receiving a polling response from the monitor target device within a predetermined time after transmitting the polling request, the monitor and control unit receives, from the monitor target device, a monitor line switching response as a response to the monitor line switching request, the monitor line switching response indicating that a port has been changed from the second connection path to the first connection path, the port being used for transmission and reception of the monitor and control signal.

2. The monitor and control device according to claim 1, wherein the monitor target device performs communication with another monitor target control device by wireless communication.

3. The monitor and control device according to claim 2, wherein the monitor target device performs communication with the other monitor target control device by wireless communication using microwave communication.

4. A monitor and control method comprising:
transmitting a monitor and control signal for monitoring and controlling a monitor target device to a monitor target device through either one of a main signal path and a monitor and control signal path, the monitor target device including a first connection path connected to the main signal path and a second connection path connected to the monitor and control signal path, the main signal path passing either a main signal in which the monitor and control signal is multiplexed or a main signal in which the monitor and control signal is not multiplexed, the monitor and control signal path passing the monitor and control signal, the monitor and control signal being transmitted to the monitor target device through the monitor and control signal path in a case of a malfunction occurred in the main signal path, and the monitor and control signal is transmitted to the monitor target device through the main signal path in a case of a malfunction occurred in the monitor and control signal path;

transmitting a polling request to the monitor target device through the monitor and control signal path;

transmitting a monitor line switching request to the monitor target device through the main signal path in a case of a polling response from the monitor target device being not received within a predetermined time after transmitting the polling request; and receiving, from the monitor target device, a monitor line switching response as a response to the monitor line switching request, the monitor line switching response indicating that a port has been changed from the second connection path to the first connection path, the port being used for transmission and reception of the monitor and control signal.

5. The monitor and control device according to claim 1, wherein the monitor and control unit requests the monitor target device to change the port from the second connection path to the first connection path by transmitting the monitor line switching request.

6. The monitor and control method according to claim 4, wherein the monitor target device is requested to change the port from the second connection path to the first connection path by the monitor line switching request.

7. The monitor and control device according to claim 1, wherein the monitor and control device includes an indoor unit, an outdoor unit and a separating and synthesizing unit.

8. The monitor and control device according to claim 7, wherein the indoor unit processes signals and realizes communication with another monitor target device.

9. The monitor and control device according to claim 7, wherein the indoor unit and the outdoor unit are connected by a cable.

10. The monitor and control device according to claim 7, wherein the outdoor unit includes an antenna and performs wireless communication with another outdoor unit with their antennas mutually facing.

11. The monitor and control method according to claim 4, wherein the monitor and control device includes an indoor unit, an outdoor unit and a separating and synthesizing unit.

12. The monitor and control method according to claim 11, wherein the indoor unit processes signals and realizes communication with another monitor target device.

13. The monitor and control method according to claim 11, wherein the indoor unit and the outdoor unit are connected by a cable.

14. The monitor and control method according to claim 11, wherein the outdoor unit includes an antenna and performs wireless communication with another outdoor unit with their antennas mutually facing.

* * * * *